United States Patent
Stefaniak et al.

(10) Patent No.: US 9,835,120 B2
(45) Date of Patent: Dec. 5, 2017

(54) INTEGRAL PURGE EJECTOR TEE ARRANGEMENT IN A TURBOCOMPRESSOR

(71) Applicants: David Stefaniak, Waterford, MI (US); Michael P Schmidt, Highland, MI (US)

(72) Inventors: David Stefaniak, Waterford, MI (US); Michael P Schmidt, Highland, MI (US)

(73) Assignee: FCA US LLC, Auburn Hills, MI (US)

( * ) Notice: Subject to any disclaimer, the term of this patent is extended or adjusted under 35 U.S.C. 154(b) by 6 days.

(21) Appl. No.: 15/192,056

(22) Filed: Jun. 24, 2016

(65) Prior Publication Data
US 2016/0305377 A1    Oct. 20, 2016

Related U.S. Application Data

(63) Continuation-in-part of application No. 14/742,008, filed on Jun. 17, 2015, now Pat. No. 9,664,154.

(60) Provisional application No. 62/014,386, filed on Jun. 19, 2014.

(51) Int. Cl.
*F02M 25/08* (2006.01)
*F02M 35/10* (2006.01)
*F02B 37/00* (2006.01)

(52) U.S. Cl.
CPC .... *F02M 35/10229* (2013.01); *F02M 25/089* (2013.01); *F02M 35/10157* (2013.01); *F02M 35/10222* (2013.01); *F02B 37/00* (2013.01); *Y02T 10/144* (2013.01)

(58) Field of Classification Search
CPC .. F02M 35/10; F02M 25/08; F02M 35/10229; F02M 35/10157; F02M 35/10222; F02M 25/089; F02B 37/00; Y02T 10/144
See application file for complete search history.

(56) References Cited

U.S. PATENT DOCUMENTS

| | | | |
|---|---|---|---|
| 7,373,930 B1 | 5/2008 | Hadre | |
| 9,133,796 B2 * | 9/2015 | Plymale | F02M 25/089 |
| 9,353,711 B2 * | 5/2016 | Edmund | F02M 35/10222 |
| 9,664,154 B2 * | 5/2017 | Bucknell | F02M 35/10229 |

* cited by examiner

*Primary Examiner* — Hieu T Vo
(74) *Attorney, Agent, or Firm* — Ralph E. Smith

(57) ABSTRACT

A turbocompressor boost purge ejector tee includes a first passage formed into a housing along a common axis from a first direction, the first passage including an outlet in communication with an inlet area of the turbocompressor. A second passage is formed into the housing along the common axis from a second direction and includes a boost air inlet in communication with a turbocompressor high pressure internal outlet area and fluidly coupled to the first passage. The first and second passages of the housing defining a first flow path from the internal outlet area to the inlet area. An inlet port is associated with the housing and intersects the first passage, the housing defining a second flow path from the inlet port to the outlet, and the second flow path intersecting the first flow path upstream of the outlet. A nozzle is positioned in the second passage.

19 Claims, 10 Drawing Sheets

INTEGRAL PURGE EJECTOR TEE ARRANGEMENT IN A TURBOCOMPRESSOR

CROSS-REFERENCE TO RELATED APPLICATIONS

This application is a continuation-in-part of U.S. application Ser. No. 14/742,008, filed Jun. 17, 2015, which claims benefit of U.S. Provisional Application Ser. No. 62/014,386, filed on Jun. 19, 2014. The disclosures of the above applications are incorporated herein by reference in their entirety.

FIELD

The present application relates generally to an evaporative fuel emissions system for an engine and, more particularly, to an integral purge ejector tee arrangement in a turbocompressor.

BACKGROUND

Modern internal combustion engines typically generate hydrocarbon emissions by evaporative means and, as a result, vehicle fuel vapor emissions to the atmosphere are regulated. For the purpose of preventing fuel vapor from escaping to the atmosphere, an evaporative emissions (EVAP) system is typically implemented to store and subsequently dispose of fuel vapor emissions. The EVAP system is typically designed to collect vapors produced inside an engine's fuel system and then send them through an engine's intake manifold into its combustion chamber to get burned as part of the aggregate fuel-air charge. When pressure inside the vehicle's fuel tank reaches a predetermined level as a result of evaporation, the EVAP system transfers the vapor to a purge canister. Subsequently, when engine operating conditions are conducive, a purge valve opens and vacuum from the intake manifold draws the vapor into the engine's combustion chamber. Thereafter, the purge canister is regenerated with newly formed fuel vapor, and the cycle can continue.

In addition to the fuel vapor recovery function, an EVAP system is often required to perform a leak-detection function. To that end, a known analog leak-detection scheme employs an evaporative system integrity monitor (ESIM) switch which stays on if the system is properly sealed, and toggles off when a system leak is detected. When the ESIM switch is toggled off, an engine control unit (ECU) detects the change and alerts an operator of the vehicle with a malfunction indicator.

In view of the above, the inventors have recognized a need for an apparatus and methodology that permits an EVAP system to accomplish its prescribed fuel evaporative emissions purge and leak detection functions in forced induction applications while reducing leak paths in the EVAP system that are potentially undetectable.

SUMMARY

In accordance with an example aspect of the invention, a turbocompressor associated with a fuel vapor emissions system that is coupled to an intake manifold of an engine is provided. The turbocompressor includes a boost purge ejector tee integrated into the turbocompressor associated with the engine. In one exemplary implementation, the boost purge ejector tee includes a first passage formed into a housing of the turbocompressor along a common axis from a first direction, the first passage including an outlet in communication with an inlet area of the turbocompressor. A second passage is formed into the housing along the common axis from a second direction, the second passage intersecting a high pressure internal outlet area of the housing to form a boost air inlet in communication with the outlet area and being fluidly coupled to the first passage, the first and second passages of the housing defining a first flow path from the internal outlet area to the turbocompressor inlet. An inlet port is associated with the housing and intersects the first passage, the housing defining a second flow path from the inlet port to the outlet, and the second flow path intersecting the first flow path upstream of the outlet. A nozzle is positioned in the second passage such that an outlet of the nozzle is proximate the intersection of the first flow path with the second flow path. During a boost operation mode, the second passage is adapted to receive boost air flow, which flows through the nozzle along the first flow path thereby creating a vacuum and drawing purge through the inlet port.

In one exemplary implementation, the first and second passages are machined into the housing and the second passage defines the nozzle such that the nozzle is integral with the housing. In this implementation, the nozzle is formed during the machining of the second passage into the housing along the common axis.

In one exemplary implementation, the second passage is formed such that the nozzle defines an internal terminal end of the second passage opposite the boost air inlet and is in communication with the first passage. A terminal end of the nozzle can form the communication with the first passage.

In one exemplary implementation, the first passage is machined along the common axis from and through an internal wall of the inlet area of the turbocompressor housing without passing through any exterior wall of the housing.

In accordance with another example aspect of the invention, a method of manufacturing a turbocompressor associated with a fuel vapor emissions system that is coupled to an intake manifold of an engine is provided. In one exemplary implementation, the method includes providing a turbocompressor housing having an air inlet area, a high pressure internal air outlet area, and an inlet port associated with the housing; machining a first passage into the turbocompressor housing along a common axis from a first direction, the first passage including an outlet in communication with an air inlet of the turbocompressor; and machining a second passage into the housing along the common axis from a second direction, the second passage intersecting the high pressure internal outlet area of the housing to form a boost air inlet in communication with the outlet area and being fluidly coupled to the first passage, the first and second passages of the housing defining a first flow path from the internal outlet area to the air inlet area. The inlet port defines a second flow path from the inlet port to the outlet, the second flow path intersecting the first flow path upstream of the outlet. The second passage defines a nozzle in the first flow path such that an outlet of the nozzle is proximate the intersection of the first flow path with the second flow path. During a boost operation mode, the second passage is adapted to receive boost air flow, which flows through the nozzle along the first flow path thereby creating a vacuum and drawing purge through the inlet port.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

The present disclosure relates generally to a purge ejector tee arrangement for an engine, such as an internal combustion engine, with forced induction. In one exemplary implementation, this purge ejector tee arrangement is associated with an EVAP system and facilitates the EVAP system performing its prescribed fuel evaporative emissions purge and leak detection functions in forced induction applications, while also cooperating with the EVAP system to ensure that various potential system leak points are detected or detectable with the leak detection function.

In accordance with various aspects of the present disclosure, the purge ejector tee arrangement is integrated into a turbocompressor. In one exemplary implementation, the purge ejector tee arrangement is integrated into a cover or housing of the turbocompressor. As will be discussed in greater detail below, such an integral purge ejector tee arrangement eliminates fluid flow lines and connections from the EVAP system, which reduces complexity and improves robustness of the EVAP system, including improved leak detection capability.

Figure 1:
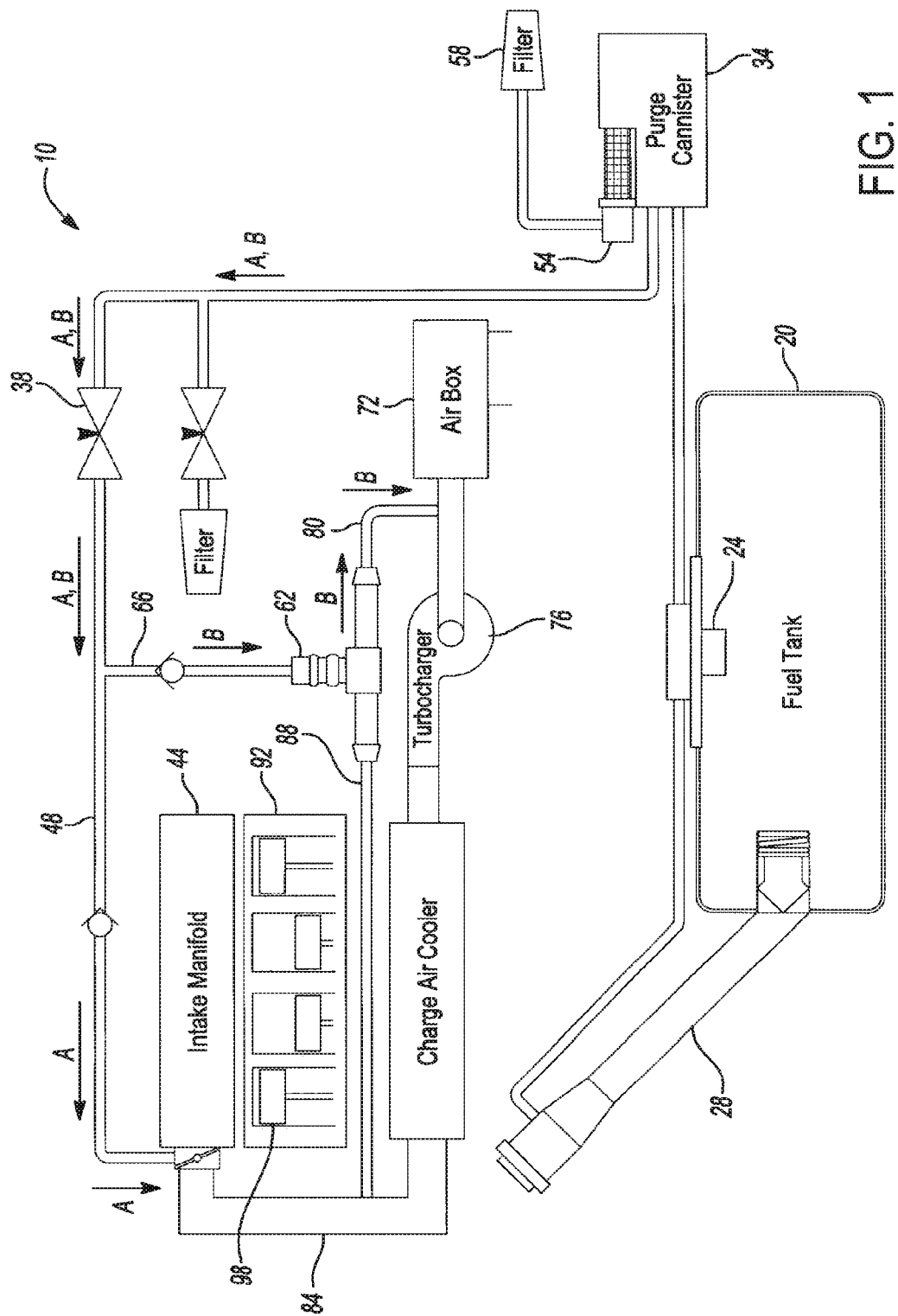
FIG. 1 is a schematic diagram of an EVAP system of a typical internal combustion engine with forced induction.

Referring now to the drawings, in which like reference numerals refer to like or similar features, FIG. 1 denotes an example of an EVAP system 10 of a typical internal combustion engine with forced induction. EVAP system 10 includes a fuel tank 20 in fluid communication with a pressure sensor 24 and a fill neck 28. A purge canister 34 is in fluid communication with fuel tank 20 for capturing fuel vapor from the fuel tank 20. Purge canister 34 is additionally in fluid communication with a purge valve 38, which releases the purge canister's fuel vapor contents to an intake manifold 44 via fluid line 48 in response to engine manifold vacuum. Purge canister 34 is also in fluid communication with an evaporative system integrity monitor (ESIM) switch 54, which is configured to stay on if the EVAP system is operatively sealed in the presence of engine vacuum, and to toggle off if the EVAP system experiences a leak (loss of vacuum). ESIM switch 54 is in fluid communication with atmosphere via a filter 58. A further discussion of exemplary ESIM switches and ESIMs can be found in commonly owned U.S. Pat. Nos. 6,823,850; 6,928,991; 7,047,950 and 7,216,636; the entire disclosure of which is incorporated herein by reference.

The purge valve 38 is also in fluid communication with a multi-port connection member 62 via a fluid line 66. Multi-port connection member 62 is in fluid communication with an air box 72 and/or inlet line to a turbocharger 76 via a fluid line 80. Multi-port connection member 62 is also in fluid communication with a turbocharger output line or air tube 84 via a fluid line 88. The turbocharger output line 84 connects an output of turbocharger 76 to intake manifold 44. Intake manifold 44 communicates vacuum generated by an engine's 92 reciprocating pistons 98, or boost pressure supplied by the exhaust-driven turbocharger 76, a crankshaft-driven supercharger (not shown), or any other pressurizing means, as is readily understood by those skilled in the art.

In a naturally aspirated mode, the purge valve 38 is controlled to allow flow therethrough, and purge (e.g., fuel vapor drawn from purge canister 34) flows to the intake manifold 44 in a flow path depicted by arrows A in FIG. 1. The fuel vapor is drawn from purge canister 34 by intake manifold vacuum and the drawn fuel vapor is transferred via intake manifold 44 to the engine's combustion chamber (not shown) to be burned with the main fuel-air charge. In a boost condition facilitated by turbocharger 76, purge flows in the direction of arrows B through purge valve 38 into multi-port connection member 62 via fluid line 66 and into the turbocharger inlet via fluid line 80. The high pressure airflow from turbocharger 76 flows through fluid line 88 and multi-port connection member 62, thereby drawing purge into fluid line 66 in the manner discussed above.

In addition to the fuel vapor recovery function, the EVAP system is also required to perform a leak detection function. In this regard, pressure sensor 24 is associated with the fuel tank 20 for measuring a system pressure. The pressure at the pressure sensor 24 is monitored by a vehicle controller or the like (not specifically shown) during operation and the vehicle and/or EVAP system to sense feedback, as is readily understood by those skilled in the art. For example, when the EVAP system 10 is operating in a boost condition, if the fluid line 88 becomes disconnected or pinched, there will be a significant reduction in flow through multi-port connection member 62. This would result in a significantly reduced draw or flow of purge through fluid line 66. This reduction in purge flow will be sensed by pressure sensor 24 in the form of a lack of vacuum in fuel tank 20. Similarly, if fluid line 66 is disconnected in the boost operating mode, purge flow cannot be drawn therethrough and thus there will also be a corresponding lack of vacuum detected at pressure sensor 24. For example, the vacuum pressure would be lower than a predetermined threshold.

If fluid line 80 becomes disconnected, however, such a scenario could potentially remain undetected by the EVAP system 10 leak detection function. With fluid line 80 disconnected, ruptured, etc., purge in a boost mode of operation could potentially flow to the atmosphere instead of into the engine in the manner discussed above. A disconnection of line 80 could be undetected by the leak detection function of EVAP system 10 in the boost mode of operation because positive pressure airflow from the turbocharger 76 flowing through fluid line 88 will draw purge from canister 34 through fluid line 66 regardless of whether line 88 is connected or disconnected. As a result, pressure sensor 24 could detect vacuum pressure above the predetermined threshold due to the purge flow in boost even when fluid line 88 is disconnected.

Turning now to FIGS. 2-7, an exemplary EVAP system is shown and generally identified at reference numeral 100 in accordance with the principles of the present disclosure. EVAP system 100 includes an integral purge ejector tee arrangement 104 configured to provide improved leak detection functionality while also reducing cost and complexity by eliminating components from the EVAP system 100. As will be discussed in greater detail below, in one exemplary implementation, the integral purge ejector tee arrangement 104 is integrated with or into a turbocompressor 106 thereby eliminating the connection lines 80 and 88 of EVAP system 10. Thus EVAP system 100 provides a more robust system with fewer components and potential leak paths while also improving leak detection capabilities and reducing cost, as will be discussed in greater detail below.

Figure 2:
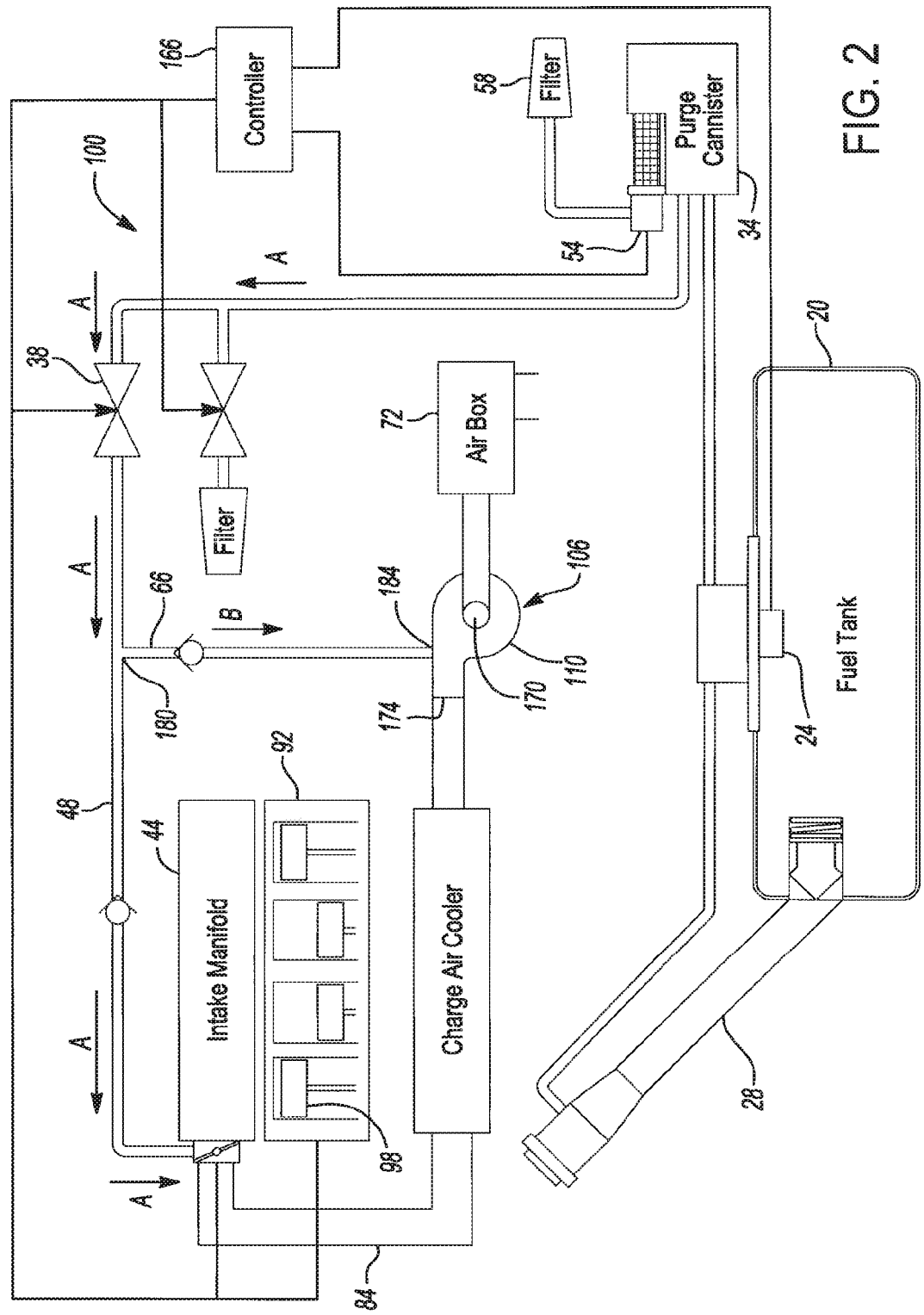
FIG. 2 is a schematic diagram of an EVAP system having an exemplary integral purge ejector tee arrangement for an internal combustion engine with forced induction according to the principles of the present disclosure.
Figure 3:
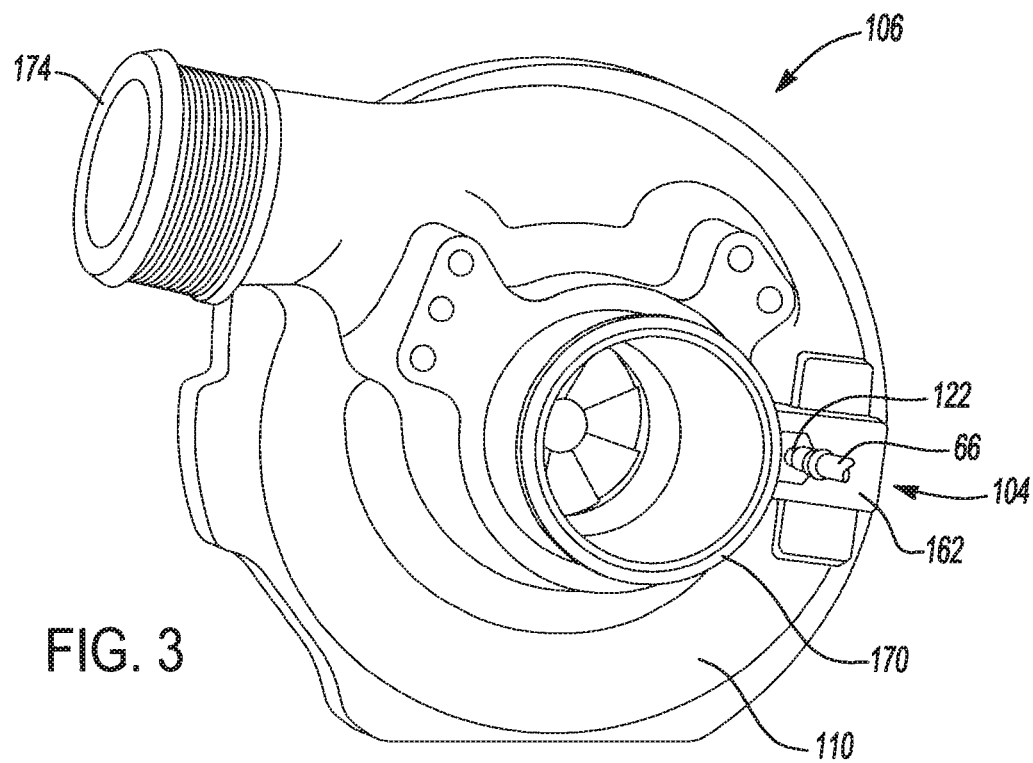
FIG. 3 is a perspective view of an exemplary turbocompressor with an exemplary integral purge ejector tee arrangement associated therewith according to the principles of the present disclosure.
Figure 4:
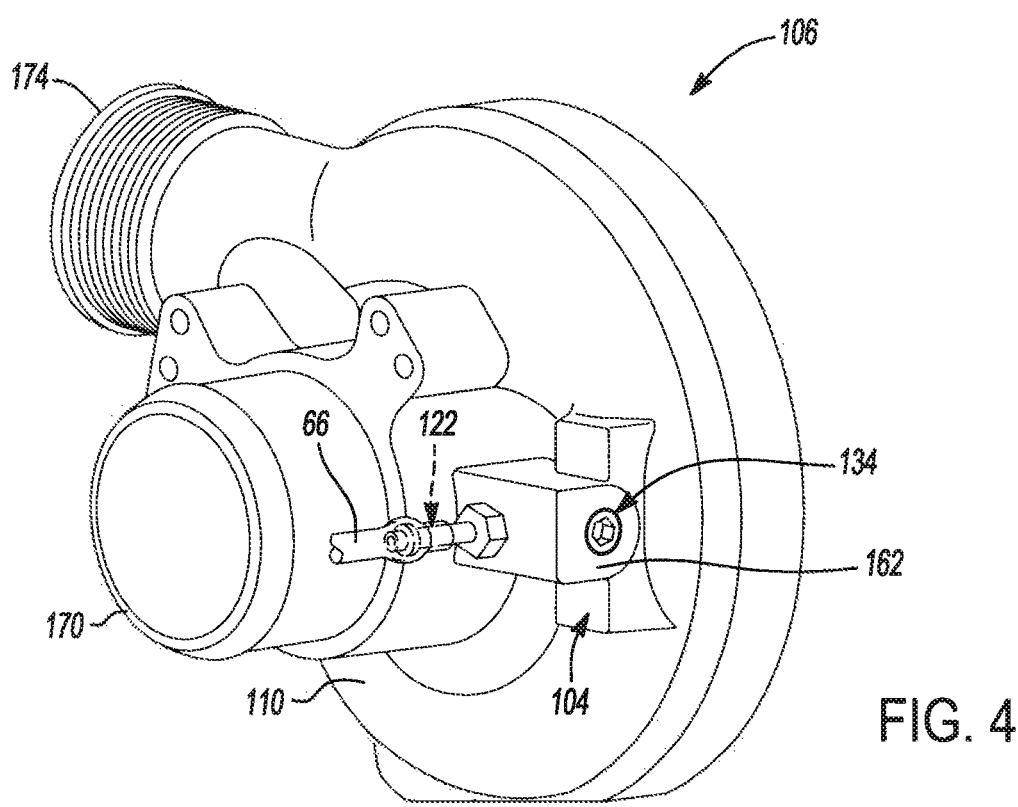
FIG. 4 is another perspective view of the exemplary turbocompressor with the exemplary integral purge ejector tee arrangement associated therewith according to the principles of the present disclosure.
Figure 5:
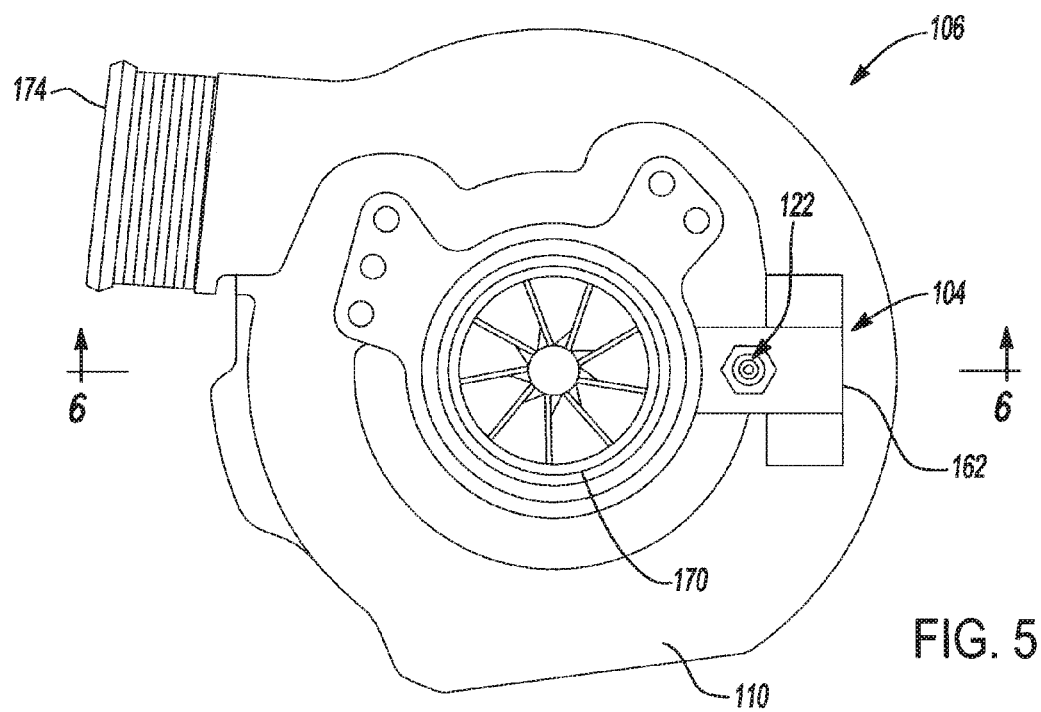
FIG. 5 is a side view of the turbocompressor with the exemplary integral purge ejector tee arrangement associated therewith according to the principles of the present disclosure.
Figure 6:
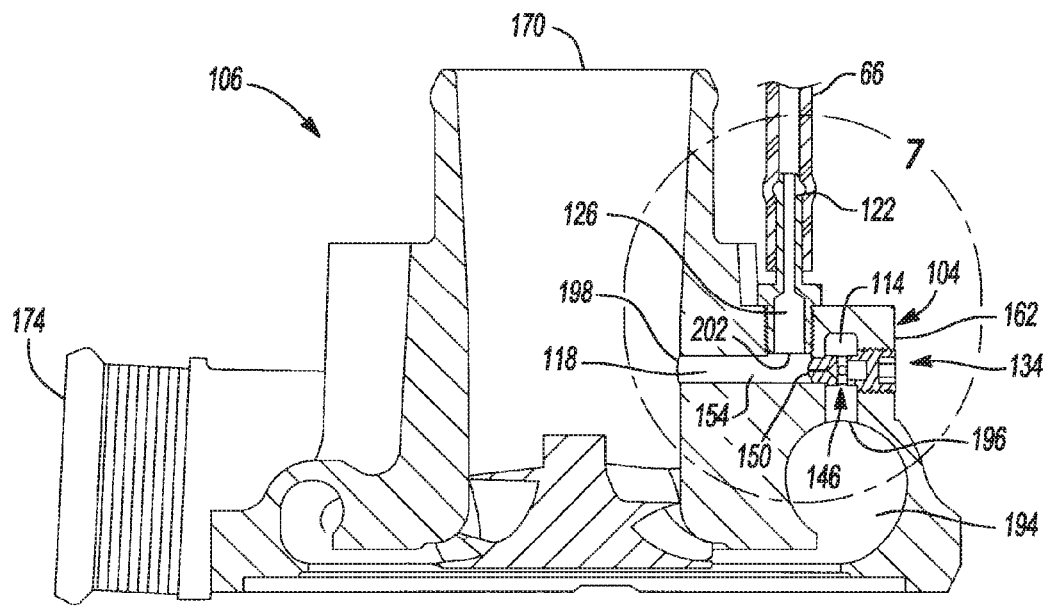
FIG. 6 is a sectional view of the turbocompressor with the exemplary integral purge ejector tee arrangement along line 6-6 of FIG. 5 according to the principles of the present disclosure.

In the exemplary schematic illustration of EVAP system 100 shown in FIG. 2, where like reference numerals refer to like components in the various figures, EVAP system 100 includes the integral purge ejector tee arrangement 104 associated with turbocompressor 106. In one exemplary implementation, the integral purge ejector tee arrangement 104 includes a purge ejector tee system formed into and/or with a cover or housing 110 of the turbocompressor 106. As briefly discussed above, this arrangement eliminates the fluid lines 80 and 88, which eliminates multiple potential leak paths as well as eliminates a portion of the EVAP system 10 that is potentially not detectable in a leaking and/or disconnected condition.

With particular reference to FIGS. 3-7, the integral purge ejector tee arrangement 104 will now be discussed in greater detail. In the exemplary implementation illustrated, the integral purge ejector tee arrangement 104 includes permanent passages formed in housing 110 of turbocompressor 106 such that the passages are internal and cannot be disconnected. In this exemplary implementation, the integral purge ejector tee arrangement 104 includes first and second passages 118 and 114, a third passage 126, a nipple or other connection member or inlet port 122, and an insert member 134. The first and second passages 118, 114 connect an inlet side of the turbocompressor housing structure 110 to an outlet or discharge (compressed air) side in communication with an outlet of turbocompressor 106.

As will be discussed in greater detail below, the inlet port 122 can be coupled or can integrally form the third passage 126 that intersects with the first passage 118, and the insert member 134 is positioned in the first passage 118 at an end opposite the end in communication with the inlet side of the turbocompressor 106. In one exemplary implementation, the inlet port 122 is directly connected to and in direct fluid communication with first passage 118. In one exemplary implementation, the inlet port 122 is integrally formed with the housing 110, such as through a casting process. In the exemplary implementation illustrated, the third passage 126 and thus inlet port 122 are positioned downstream of second passage 114 from a perspective of a flow of compressed or boost air from the outlet side to the inlet side of the turbocompressor 106. As will be discussed in greater detail below, the inlet port 122 is coupled to the fluid line 66.

The insert member 134 includes an orifice 138 and is positioned in first passage 118 such that the orifice is downstream of the second passage 114 but upstream of passage 126, as will also be discussed below in greater detail. In one exemplary implementation, the orifice 138 forms a venturi nozzle. As will be discussed in greater detail below, the venturi nozzle creates a vacuum effect due to the increased velocity of the flow therethrough thereby drawing fluid through the inlet port 122 from fluid line 66 coupled thereto.

Figure 7:
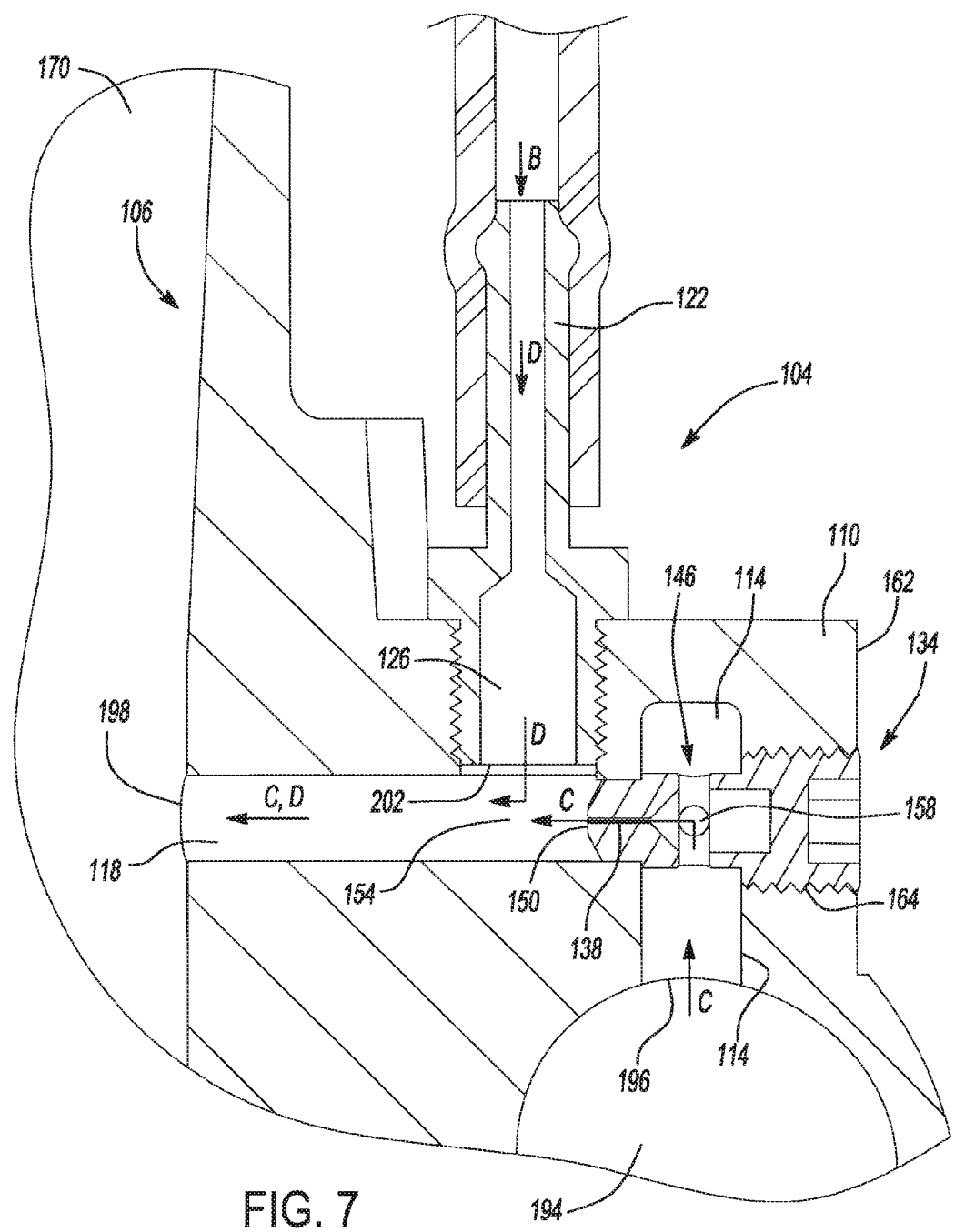
FIG. 7 is an enlarged view of area 7 of FIG. 6 according to the principles of the present disclosure.

The insert member 134 includes a flow entrance 146 in fluid communication with the orifice/nozzle 138. The insert member 134 is positioned in first passage 118 such that the flow entrance 146 is aligned with second passage 114 and an outlet 150 of the orifice 138 is positioned upstream or substantially upstream of an intersection 154 of passages 118 and 126. In one exemplary implementation, the flow entrance 146 includes one or more radial passages 158 in fluid communication with venturi nozzle 138. It will be appreciated that the features and operation of the insert member 134 could optionally be integrally formed in the housing structure 110. In one exemplary implementation, the insert member 134 is positioned in or at least partially in the first passage 118 and the second passage 114 such that the one or more radial passages 158 are aligned with the second passage 114 and the nozzle 138 is positioned in and aligned with the first passage 118 downstream of the second passage 114, as shown in FIG. 7.

In one exemplary implementation, the second passage 114 is a blind passage formed in the housing structure 110, as shown in the various figures. In this exemplary implementation, the first passage 118 is formed as a through passage from an exterior 162 of the housing structure 110 to an inlet side of the turbocompressor 106. Once the first passage 118 is formed in the exemplary manner discussed above, the insert member 134 may also provide the function of sealing off a portion 164 of first passage 118 between an intersection of passages 114 and 118 and the exterior 162 of housing structure 110, as also shown in the various figures. Alternatively, a separate cap or closure member could be utilized to seal off the portion 164 of passage 118. In one exemplary implementation, the inlet port 122 and the insert member 134 are threadably coupled to the turbocompressor housing 110.

With particular reference to FIG. 2 and continuing reference to FIGS. 3-7, operation of the EVAP system 100 will now be discussed in greater detail. As briefly mentioned above, EVAP system 100 includes the integral purge ejector tee arrangement 104, which replaces/eliminates the external multi-port connection member 62 and fluid lines 80 and 88. This integral purge ejector tee arrangement 104 thereby reduces complexity and improves robustness of the EVAP system 100, including improved leak detection capability.

The EVAP system 100, in the exemplary implementation illustrated, includes a controller 166, the air box 72 coupled to an inlet 170 of turbocompressor 106, and an outlet or discharge 174 in fluid communication with a charge air cooler and the intake manifold 44. The fluid line 66 is coupled at one end 180 to fluid line 48 and at an opposite end 184 to third passage 126 via inlet port 122 of the integral purge ejector tee arrangement 104. In one exemplary implementation, the fluid line 66 provides direct fluid communication between the purge inlet to the integral purge ejector tee arrangement 104 (e.g., passage 126) and the purge valve 38. As discussed above, the exemplary EVAP system 100 that includes the exemplary integral ejector tee arrangement 104 eliminates the need for an external tee member 62 as well as fluid lines 80 and 88. It will be appreciated, however, that other EVAP system configurations associated with forced induction engines can be utilized with the integral purge ejector tee arrangement 104.

In operation, in a naturally aspirated mode, the purge valve 38 is selectively controlled to allow flow therethrough, and purge can flow to the intake manifold 44 in a flow path depicted by arrows A in FIG. 2. The purge is drawn from purge canister 34 by intake manifold vacuum and is transferred via intake manifold 44 to the engine's combustion chamber (not specifically shown) to be burned with the main fuel-air charge. In a boost mode of operation facilitated by turbocompressor 106, high pressure or compressed air (boost air) flow from turbocompressor 106 having a higher pressure than manifold pressure flows from turbocompressor outlet 174 to the intake manifold 44 through air tube 84.

In this boost mode of operation, air enters turbocompressor 106 via inlet 170 and is compressed and flows as compressed or boost air into turbocompressor volute area 194, which is on the outlet or discharge side of turbocompressor 106, as is readily appreciated by those skilled in the art. The outlet side housing compressed air, such as volute area 194, is in direct fluid communication with second passage 114, as shown in the various figures. The compressed or boost air from volute area 194 flows into second passage 114 via inlet 196 and into flow entrance 146 of insert member 134 along a first flow path C inside turbocompressor 106, as shown in FIG. 7.

Once in insert member 134, the boost air flows through orifice or venturi nozzle 138 and exits at a higher velocity through outlet 150, which creates a low pressure or vacuum when flowing past intersection 154 to an outlet 198 of flow passage 118 along the first flow path C. This vacuum or low pressure draws purge along flow path B of fluid line 66 and through connection member or inlet port 122 along a second flow path D inside turbocompressor 106. In particular, the vacuum created by the high speed boost air flow past intersection 154 draws purge through purge valve 38, through fluid line 66 and directly into inlet port 122 along the second flow path D. The purge is drawn through inlet port 122 and exits the inlet port via outlet 202 and flows along flow path D into a portion of passage 118 downstream of outlet 202 and intersection 154, where it mixes with the high speed boost air flowing toward outlet 198 of passage 118 along combined flow paths C and D, as also shown in FIG. 7. The combined boost air and purge then flows through and exits turbocompressor 106 at outlet 174, where it then flows to the engine and is burned as part of the aggregate fuel-air charge.

Figure 8:
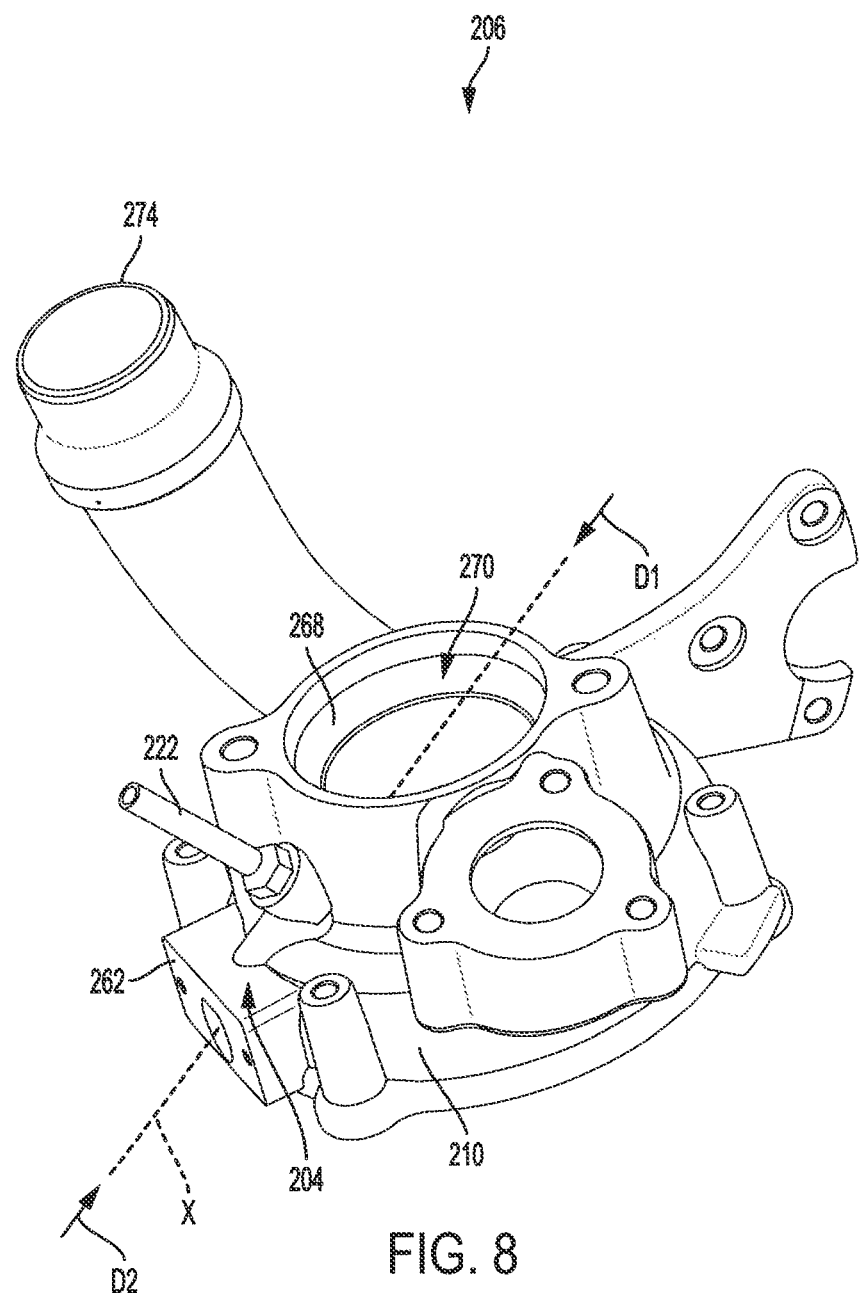
FIG. 8 is a perspective view of another exemplary turbocompressor with an integral purge ejector tee arrangement according to the principles of the present disclosure.
Figure 9:
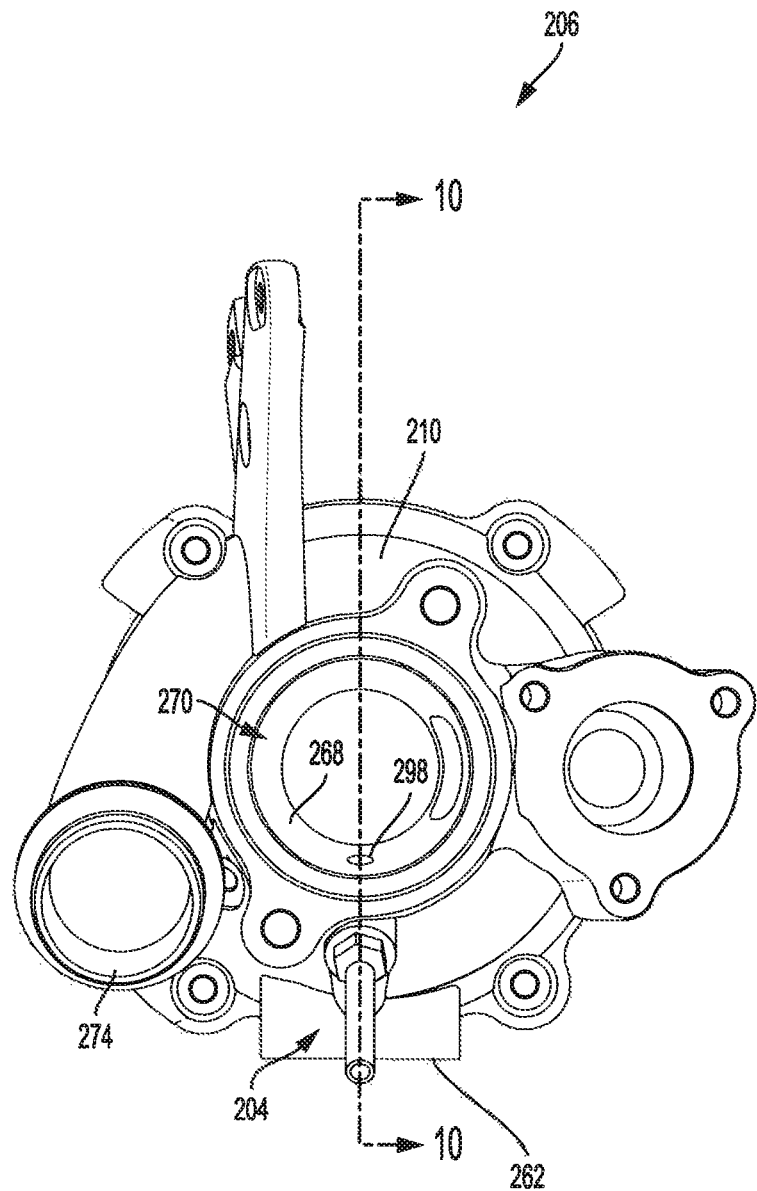
FIG. 9 is a side view of the exemplary turbocompressor shown in FIG. 8 according to the principles of the present disclosure.
Figure 10:
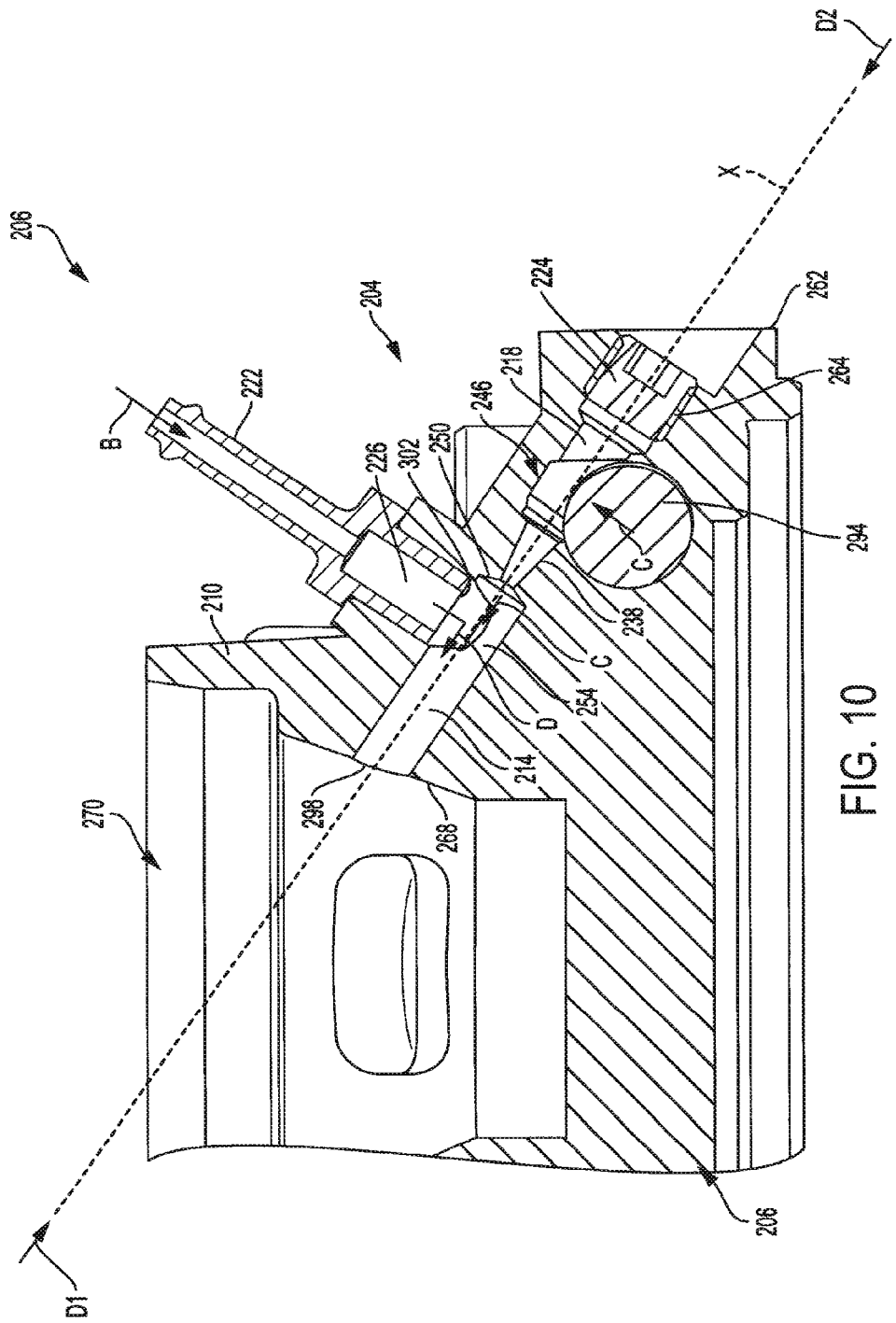
FIG. 10 is a cross-sectional view of the exemplary turbocompressor of FIG. 8 taken along line 10-10 according to the principles of the present disclosure.

Turning now to FIGS. 8-10, another example purge ejector tee arrangement is generally identified at 204 and may be utilized with EVAP system 100. The purge ejector tee arrangement 204 is configured to provide improved leak detection functionality while also reducing cost and complexity by eliminating components from the EVAP system 100. As will be discussed in greater detail below, in one exemplary implementation, the purge ejector tee arrangement 204 is integrated with or into a turbocompressor 206, thereby eliminating the connection lines 80 and 88 of EVAP system 10. Thus, the purge ejector tee arrangement 204 similarly provides the EVAP system 100 with a more robust system having fewer components and potential leak paths while also improving leak detection capabilities and reducing cost.

Moreover, as described herein in more detail, the purge ejector tee arrangement 204 includes integral fluid passages formed along a common axis. These integral fluid passages require minimal machining and/or forming through the housing of turbocompressor 206, thereby reducing manufacturing complexity and reducing or eliminating plugs and/or other sealing operations. Accordingly, only two fluid passages are required to be machined or formed along the common axis. A first fluid passage is formed along the common axis through an interior wall defining the turbocompressor inlet without passing through any exterior walls of the turbocompressor housing. The first fluid passage intersects with a purge inlet passage. A second fluid passage is formed along the common axis from an exterior wall of the turbocompressor housing and intersects a high pressure area or volute of the turbocompressor to receive pressurized fluid therefrom. The second fluid passage includes an integrally formed nozzle (venturi) that communicates with the first fluid passage. As such, a separate nozzle is not required, and only a single machining axis (common axis) and single sealing plug are required.

In one exemplary implementation, the purge ejector tee arrangement 204 includes a purge ejector tee formed into a housing 210 of the turbocompressor 206. As briefly discussed above, this arrangement eliminates the fluid lines 80 and 88, which eliminate multiple potential leak paths as well as eliminate a portion of the EVAP system 10 that is potentially not detectable in a leaking and/or disconnected condition.

With particular reference to FIG. 10, the integral purge ejector tee arrangement 204 will now be discussed in greater detail. In the exemplary implementation illustrated, the integral purge ejector tee arrangement 204 includes permanent passages formed in a housing 210 of turbocompressor 206 such that the passages are internal and cannot be disconnected. In this exemplary implementation, the integral purge ejector tee arrangement 204 includes first and second passages 214 and 218, a third passage 226, a fitting or other connection member or inlet port 222, and a single plug 224. The first and second passages 214, 218 connect an inlet side of the turbocompressor housing structure 210 to an outlet or discharge (compressed air) side in communication with an outlet of turbocompressor 206.

As will be discussed in greater detail below, the inlet port 222 can be coupled within or can integrally formed with the third passage 226 that intersects at 254 with the first passage 214. In one example implementation, third passage 226 can be machined or drilled into housing 210. The plug 224 is positioned in the second passage 218 at an end opposite the end in communication with the inlet side of the turbocompressor 206. In one exemplary implementation, the inlet port 222 is directly connected to and in direct fluid communication with first passage 214. In one exemplary implementation, the inlet port 222 is a machined fitting threadably secured at least partially within the third passage 226. In the exemplary implementation illustrated, the third passage 226 and thus inlet port 222 are positioned downstream of second passage 218 from a perspective of a flow of compressed or boost air from the outlet side to the inlet side of the turbocompressor 206. The inlet port 222 is coupled to the fluid line 66 (FIG. 2).

In one exemplary implementation, the second passage 218 includes an orifice 238 that forms a venturi nozzle. The venturi nozzle creates a vacuum effect due to the increased velocity of the flow therethrough thereby drawing fluid through the inlet port 222 from fluid line 66 coupled thereto. In this exemplary implementation, the orifice/nozzle is integrally formed in/with the second passage such that an additional or extra machining operation is not required to form the nozzle. In this implementation, the nozzle is formed at an internal end of the second passage and a terminal end of the nozzle communicates with and connects the second passage 218 with the first passage 214.

The second passage 218 includes a boost air inlet or flow entrance 246 in fluid communication between the orifice/nozzle 238 and an internal outlet area or compressor volute 294. In this way, the second passage 218 intersects the volute 294 such that a separate passage is not required to fluidly connect the volute 294 and the second passage 218. In one example implementation, flow entrance 246 may be formed during casting of housing 210. The plug 224 is positioned in second passage 218 such that air flow from the flow entrance 246 is directed through an outlet 250 of the orifice 238 that is positioned upstream or substantially upstream of the intersection 254 of passages 214 and 226.

In one exemplary implementation, the first and second passages 214, 218 are formed along a common axis 'X' to intersect with both the third passage 226 and the volute 294, thereby reducing manufacturing complexity, obviating the need for a separate nozzle, and only requiring a single plug seal 224.

Accordingly, in one example implementation, the first passage 214 is formed by machining through an internal wall 268 of an inlet 270 of the housing structure 210 by drilling along common axis 'X' from a first direction D1. In this exemplary implementation, the second passage 218 is formed by machining through an external or exterior wall 262 of the housing structure 210 along common axis 'X' from an opposite second direction D2 toward an inlet side of the turbocompressor 206. Once the second passage 218 is formed in the exemplary manner discussed above, the plug 224 may be inserted to seal off a portion 264 of second passage 218 between an intersection of passage 218 and volute 294 and the exterior 262 of housing structure 210, as also shown in the various figures. In one exemplary implementation, the inlet port 222 and the plug 224 are threadably coupled to the turbocompressor housing 210.

It should be noted that the EVAP system 100 with turbocompressor 206 operates in a manner similar to the system with turbocompressor 106, as described herein. However, turbocompressor 206 only requires a simple two-step machining operation along a common axis 'X' to form the first passage 214 and the second passage 218, which advantageously and respectively intersect with third passage 226 and volute 294 without requiring additional passages. The third inlet passage 226 may extend along an axis perpendicular to or substantially perpendicular to axis 'X'. Accordingly, similar to that mentioned above, EVAP system 100 includes the integral purge ejector tee arrangement 204, which replaces/eliminates the external multi-port connection member 62 and fluid lines 80 and 88. This integral purge ejector tee arrangement 204 thereby reduces complexity and improves robustness of the EVAP system 100, including improved leak detection capability. It will be appreciated, however, that other EVAP system configurations associated with forced induction engines can be utilized with the integral purge ejector tee arrangement 204.

In a similar operation to turbocompressor 106, the boost or high pressure flow C created by venturi nozzle 238 draws purge along low pressure flow path B of fluid line 66 and through connection member or inlet port 222 along a second flow path D inside turbocompressor 206. In particular, the vacuum created by the high speed boost air flow past intersection 254 draws purge through purge valve 38, through fluid line 66 and directly into inlet port 222 along the second flow path D. The purge is drawn through inlet port 222 and exits the inlet port via outlet 302 and flows along flow path D into a portion of passage 214 downstream of outlet 302 and intersection 254, where it mixes with the high speed boost air flowing toward outlet 298 of passage 214 along combined flow paths C and D, as shown in FIG. 10. The combined boost air and purge then flows through and exits turbocompressor 206 at an outlet 274, where it then flows to the engine and is burned as part of the aggregate fuel-air charge.

Figure 11:
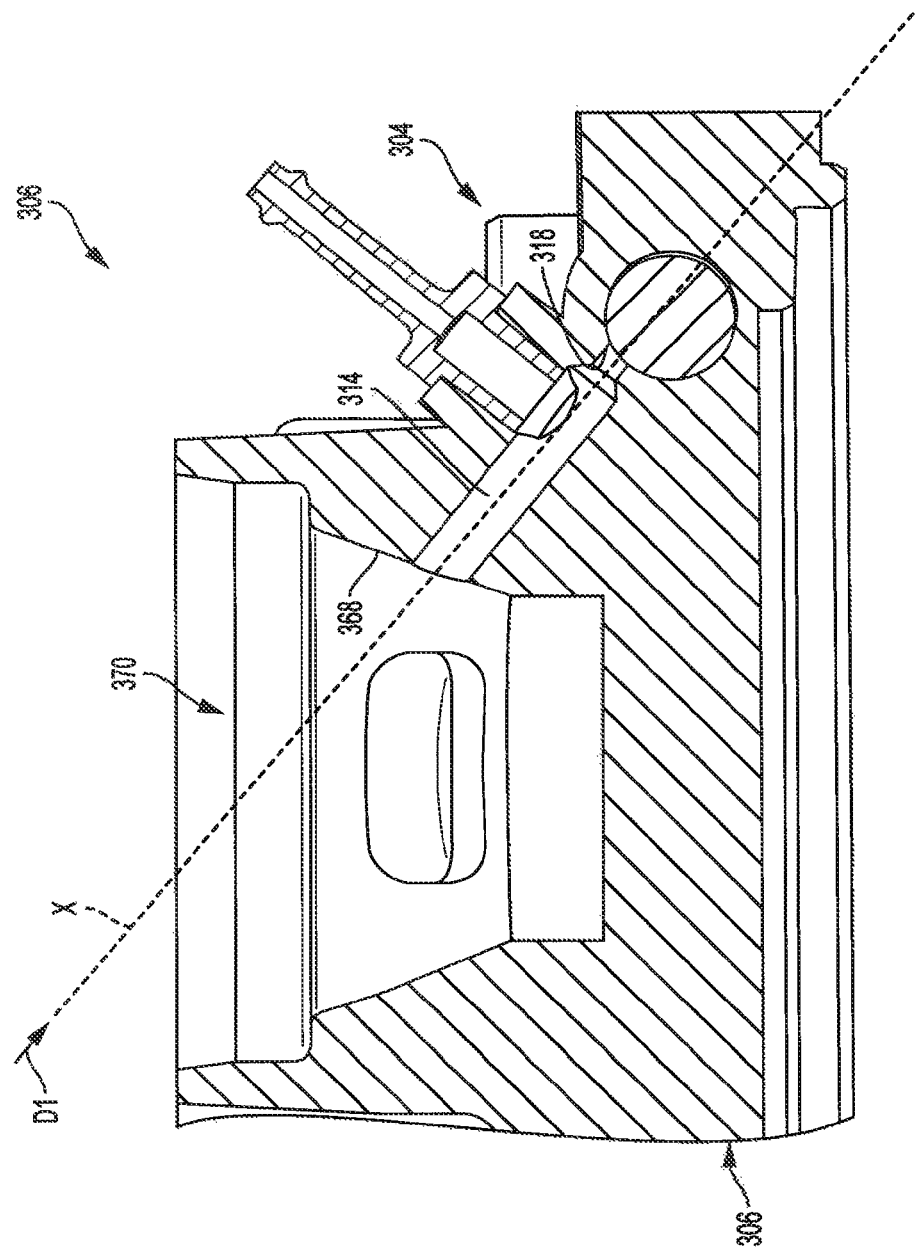
FIG. 11 is a cross-sectional view of yet another exemplary turbocompressor with an integral purge ejector tee arrangement according to the principles of the present disclosure.

FIG. 11 illustrates another turbocompressor 306 and integral purge ejector tee arrangement 304 similar to turbocompressor 206 except first and second passages 314 and 318 are formed along the same common axis 'X' from the same location and in the same direction D1. In particular, passages 314 and 318 are machined through an internal wall 368 of an inlet 370 of the turbocompressor 306. The second passage 318 has a smaller diameter than the first passage 314 and functions as the venturi nozzle. As such, the smaller second passage 318 may be formed or machined along axis 'X', and the larger first passage 314 may be machined along axis 'X' thereafter. Alternatively, the larger first passage 314 is formed along axis 'X' first and the second passage 318 is formed along axis 'X' thereafter.

Figure 12:
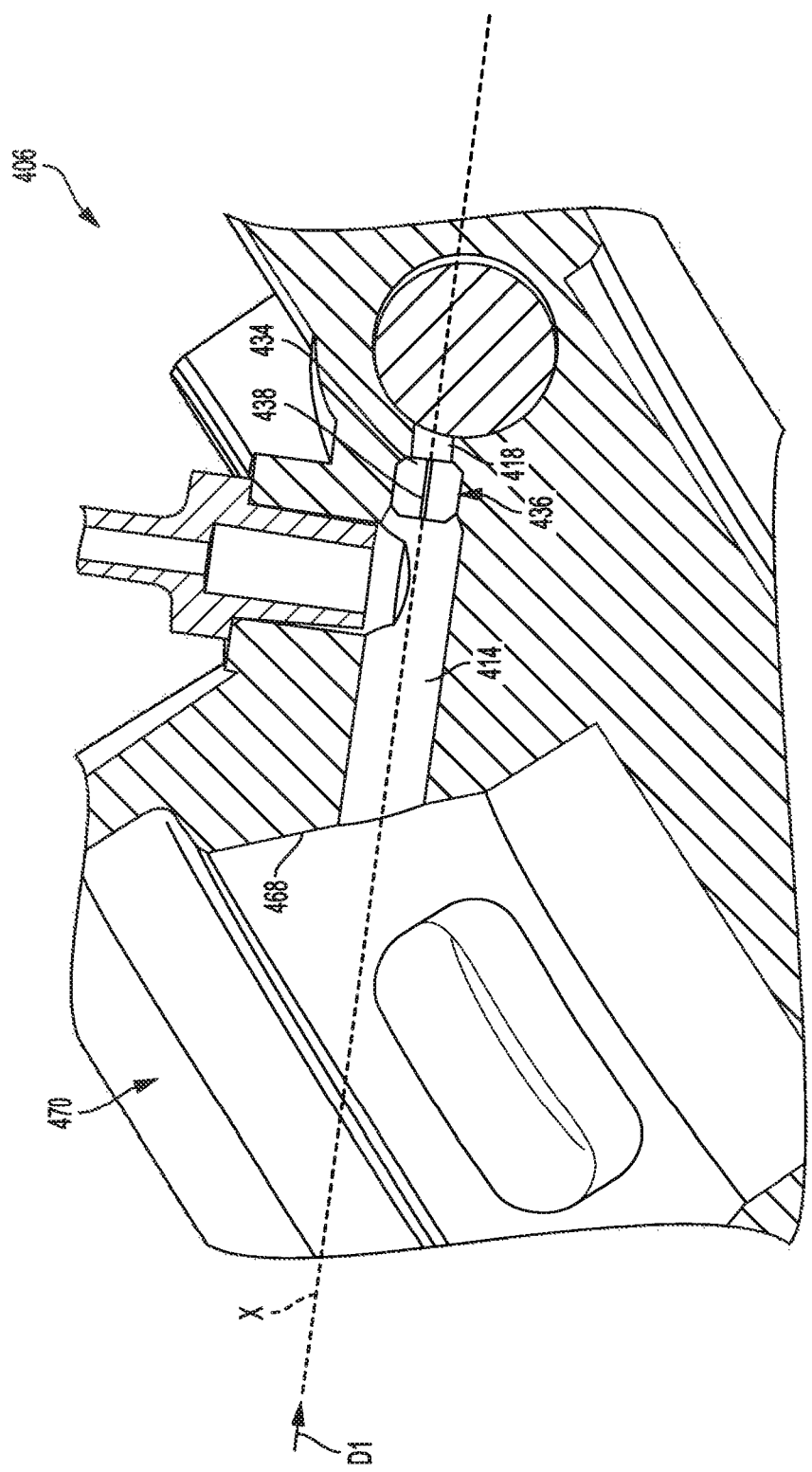
FIG. 12 is a cross-sectional view of yet another exemplary turbocompressor with an integral purge ejector tee arrangement according to the principles of the present disclosure.

FIG. 12 illustrates another turbocompressor 406 and integral purge ejector tee arrangement 404 similar to turbocompressor 306 except an insert 434 may be disposed in a necked down portion 436 between first and second passages 414 and 418 that are formed along the same axis 'X' from the same location (internal wall 468 of inlet 470) and direction D1. The insert 434 includes an orifice 438 configured as the venturi nozzle.

As such, the turbocompressors described herein and illustrated in FIGS. 1-12 integrate a purge port into the turbocompressor cover using bleed air from the turbocompressor to provide vacuum ejector tee motive force to draw purge vapor into the engine when intake manifold vacuum is unavailable. Such turbocompressors may include fully machined passages and eliminate the need for a separate ejector tee and orifice. The machined passages are formed along a common axis from at least an interior wall of the turbocompressor inlet, thereby reducing manufacturing complexity, lowering costs, and reducing required parts compared to typical systems.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A turbocompressor associated with a fuel vapor emissions system that is coupled to an intake manifold of an engine, the turbocompressor comprising:
   a boost purge ejector tee integrated into a turbocompressor associated with the engine, the boost purge ejector tee including:
      a first passage formed into a housing of the turbocompressor along a common axis from a first direction, the first passage including an outlet in communication with an inlet area of the turbocompressor;
      a second passage formed into the housing along the common axis from a second direction, the second passage intersecting an internal outlet area of the housing to form a boost air inlet in communication with the outlet area and being fluidly coupled to the first passage, the first and second passages of the housing defining a first flow path from the internal outlet area to the turbocompressor inlet;
      an inlet port associated with the housing and intersecting the first passage, the housing defining a second flow path from the inlet port to the outlet, the second flow path intersecting the first flow path upstream of the outlet; and
      a nozzle positioned in the second passage such that an outlet of the nozzle is proximate the intersection of the first flow path with the second flow path;
   wherein during a boost operation mode, the second passage is adapted to receive boost air flow, which flows through the nozzle along the first flow path thereby creating a vacuum and drawing purge through the inlet port.

2. The turbocompressor of claim 1, wherein the first and second passages are machined into the housing; and wherein the second passage defines the nozzle such that the nozzle is integral with the housing, the nozzle formed during the machining of the second passage into the housing along the common axis.

3. The turbocompressor of claim 2, wherein the second passage is formed such that the nozzle defines an internal terminal end of the second passage opposite the boost air inlet and in communication with the first passage; and wherein a terminal end of the nozzle forms the communication with the first passage.

4. The turbocompressor of claim 2, wherein the first passage is machined along the common axis from and through an internal wall of the inlet area of the turbocompressor housing without passing through any exterior wall of the housing.

5. The turbocompressor of claim 4, wherein the second passage is machined into the housing in the second direction along the common axis from an outer surface of the turbocompressor housing.

6. The turbocompressor of claim 5, wherein the first direction is opposite the second direction.

7. The turbocompressor of claim 2, wherein the nozzle is a venturi nozzle.

8. The turbocompressor of claim 1, wherein the second passage has a smaller diameter than the first passage, the second passage configured as the nozzle, which functions as a venturi to draw purge through the inlet port.

9. The turbocompressor of claim 1, further comprising a necked down portion machined between the first passage and the second passage.

10. The turbocompressor of claim 9, further comprising an insert disposed within the necked down portion, the insert including the nozzle, which functions as a venturi to draw purge through the inlet port.

11. The turbocompressor of claim 1, wherein the inlet port extends along an axis substantially perpendicular to the common axis.

12. The turbocompressor of claim 1, wherein the inlet port is adapted to be in communication with a purge valve of the fuel vapor emissions system, which is in fluid communication with a purge canister of the fuel vapor emissions system;
   wherein the nozzle comprises a venturi nozzle; and
   wherein in the boost operation mode, the boost air flows through the first passage and the venturi nozzle along the first flow path, thereby creating a vacuum to draw the purge from the purge canister through the inlet port into the first flow path and into the turbocompressor inlet via the first passage outlet.

13. The turbocompressor of claim 1, further comprising a third passage integrally formed into the housing and intersecting the first passage, the third passage receiving the inlet port.

14. The turbocompressor of claim 1, wherein the boost air inlet of the second passage is in direct fluid communication with a volute area of the turbocompressor.

15. A method of manufacturing a turbocompressor associated with a fuel vapor emissions system that is coupled to an intake manifold of an engine, the method comprising:
   providing a turbocompressor housing having an air inlet area, a high pressure internal air outlet area, and an inlet port associated with the housing;
   machining a first passage into the turbocompressor housing along a common axis from a first direction, the first passage including an outlet in communication with the air inlet area of the turbocompressor; and
   machining a second passage into the housing along the common axis from a second direction, the second passage intersecting a high pressure internal outlet area of the housing to form a boost air inlet in communication with the outlet area and being fluidly coupled to the first passage, the first and second passages of the housing defining a first flow path from the internal air outlet area to the air inlet area;
   wherein the inlet port defines a second flow path from the inlet port to the outlet, the second flow path intersecting the first flow path upstream of the outlet;
   wherein the second passage defines a nozzle in the first flow path such that an outlet of the nozzle is proximate the intersection of the first flow path with the second flow path;
   wherein during a boost operation mode, the second passage is adapted to receive boost air flow, which flows through the nozzle along the first flow path thereby creating a vacuum and drawing purge through the inlet port.

16. The method of claim 15, wherein the first passage is machined through an internal wall of the turbocompressor air inlet without passing through an external wall of the turbocompressor housing; and
   wherein the outlet of the first passage is formed in the internal wall.

17. The method of claim 16, wherein the second passage is machined through an external wall of the turbocompressor housing, the second passage directly intersecting with a volute associated with the air outlet; and wherein the nozzle is integrally formed when machining the second passage into the housing.

18. The method of claim 16, wherein the second passage is machined such that the nozzle defines an internal terminal end of the second passage opposite the boost air inlet and in communication with the first passage; and wherein a terminal end of the nozzle forms the communication with the first passage.

19. The method of claim 18, wherein the first passage, the second passage, and the inlet port form the only passages of a boost purge ejector tee integrated into a turbocompressor.

* * * * *